US008700623B2

(12) United States Patent
Fay et al.

(10) Patent No.: US 8,700,623 B2
(45) Date of Patent: *Apr. 15, 2014

(54) ACTIVITIES BASED DYNAMIC DATA PRIORITIZATION

(75) Inventors: Peter Fay, Westford, MA (US); Barry Alan Feigenbaum, Austin, TX (US); Elizabeth Vera Woodward, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/460,421

(22) Filed: Apr. 30, 2012

(65) Prior Publication Data

US 2013/0159297 A1     Jun. 20, 2013

Related U.S. Application Data

(63) Continuation of application No. 13/328,981, filed on Dec. 16, 2011.

(51) Int. Cl.
*G06F 7/00*         (2006.01)
*G06F 17/30*        (2006.01)

(52) U.S. Cl.
USPC ......................................... 707/731; 707/732

(58) Field of Classification Search
USPC .......................................... 707/735, 731–733
See application file for complete search history.

(56) References Cited

U.S. PATENT DOCUMENTS

| 7,461,061 | B2 | 12/2008 | Aravamudan et al. |
| 7,818,392 | B1 | 10/2010 | Martino et al. |
| 7,885,904 | B2 | 2/2011 | Aravamudan et al. |
| 7,895,209 | B2 | 2/2011 | Spence et al. |
| 7,930,286 | B2* | 4/2011 | Sue ............................... 707/706 |
| 8,131,718 | B2* | 3/2012 | Tran ............................. 707/732 |
| 8,296,309 | B2* | 10/2012 | Brassil et al. ................ 707/758 |
| 2002/0099685 | A1* | 7/2002 | Takano et al. ..................... 707/1 |
| 2004/0267700 | A1 | 12/2004 | Dumais et al. .................... 707/2 |
| 2005/0278368 | A1* | 12/2005 | Benedikt et al. ............. 707/101 |
| 2006/0047635 | A1* | 3/2006 | Kraenzel et al. ................ 707/3 |
| 2006/0190430 | A1* | 8/2006 | Luo et al. ......................... 707/3 |
| 2008/0097979 | A1 | 4/2008 | Heidloff et al. |
| 2009/0182822 | A1 | 7/2009 | O'sullivan et al. |
| 2009/0182823 | A1 | 7/2009 | O'sullivan et al. |
| 2009/0182831 | A1 | 7/2009 | O'sullivan et al. |

(Continued)

OTHER PUBLICATIONS

Jive, Employee Community & Collaboration Software, http://www.jivesoftware.com/products/engage-employees, Copyright 2000-2013 Jive Software. The new way to business.™ All rights reserved.

(Continued)

*Primary Examiner* — James E Richardson
(74) *Attorney, Agent, or Firm* — Garg Law Firm, PLLC; Rakesh Garg; John Flynn (57) ABSTRACT

A method for activity based dynamic data prioritization is provided in the illustrative embodiments. A user activity corresponding to a user is selected. A query is constructed corresponding to the user activity. The query is executed on a data source to obtain a result set of data. A prioritization rule is constructed using a feature of the query and a policy. Data items in the result set of data are prioritized according to the prioritization rule to form prioritized data. The prioritized data is presented relative to the user activity.

12 Claims, 7 Drawing Sheets

(56) References Cited

U.S. PATENT DOCUMENTS

| | | |
|---|---|---|
| 2009/0182832 A1 | 7/2009 | O'sullivan et al. |
| 2011/0004831 A1 | 1/2011 | Steinberg et al. |
| 2011/0125829 A1 | 5/2011 | Finley et al. |
| 2011/0161419 A1 | 6/2011 | Chunilal |
| 2011/0225235 A1 | 9/2011 | Schmidt |
| 2012/0054179 A1* | 3/2012 | Zhu et al. ............... 707/723 |
| 2012/0191725 A1* | 7/2012 | Keeley et al. ............. 707/748 |
| 2012/0269116 A1* | 10/2012 | Xing et al. .............. 370/328 |

OTHER PUBLICATIONS

My6sense, my6sense—your digital intuition, http://www.my6sense.com, my6sense. info©my6sense.com, Copyright 2013.

Otherinbox, Save your inbox for real people, http://www.otherinbox.com, 2013.

Eric Friedman, Jan. 11, 2009, Marketing FM, Prioritizing and Organizing Feeds in Google Reader, http://www.marketing.fm/2009/01/11/prioritizing-and-organizing-feeds . . . .

* cited by examiner

| TIME | ACTIVITY EVENT | SEARCH QUERY | SORT RULE |
|---|---|---|---|
| 09:00 | CONNECTIONS ACCESSIBILITY, CHAIR: FRANCES, W/ JANE Q COMMON, JOHN Q PUBLIC, WILSON WILSON | CONNECTION OR ACCESSIBILITY OR FRANCES, OR JANE, OR JOHN OR WILSON | { CONTENT: FRANCES, JANE, ACCESSIBILITY, WILSON TIME: 3 DAYS } |
| 10:40 | WEBSPHERE ON CLOUD BY SMITH | WEBSPHERE OR CLOUD OR SMITH | { CONTENT: CLOUD, WEBSPHERE, SMITH TIME: 3 DAYS } |
| 11:30 | SAMETIME W/ WILSON ON FALL PROJECT PLAN FOR VIDEO CAPTIONS | FALL & PROJECT PLAN OR WILSON OR VIDEO OR CAPTION | { CONTENT: VIDEO, FALL PROJECT PLAN, WILSON, CAPTION TIME: 3 DAYS } |
| 16:40 | TENNIS WITH JOHN | TENNIS OR JOHN | { CONTENT: JOHN, TENNIS TIME: 3 DAYS } |

502 — ACTIVITY EVENT
504 — SEARCH QUERY
506 — SORT RULE
500

*FIG. 6*

| RULE | WEIGHT (1.10 SCALE) |
|---|---|
| SUBJECT/TOPIC: RELEASE DATE | 8 |
| TAG: ACCESSIBILITY, OR PRODUCT NAME "XYZ" | 8 |
| POST TYPE: ACTIVITY | 5 |
| POST TYPE: FILE | 4 |
| POST TYPE: BLOG MESSAGE | 3 |
| FROM: MOBILE COMMUNITY, OR ROLE "DEPARTMENT HEAD" | 4 |
| ABOUT: PROGRAMMER COMMUNITY, OR SELF | 2 |
| FROM: LAST NAME "DOE" | 2 |

| | |
|---|---|
| FROM ORGANIZATION (FEDERAL TRADE COMMISSION, ABCD CO.) | MULTIPLE WEIGHT BY 2 |
| FROM TITLE | TITLE THAT INCLUDES PROVIDED KEYWORDS IS DOUBLED |
| FROM PARTICULAR LOCATION | MULTIPLE WEIGHT BY INVERSE DISTANCE (CLOSER GETS BIGGER) |
| FROM ROLE (ARCHITECT, STSM, DE, TEST SPECIALIST,...) | EACH ROLE HAS DIFFERENT MULTIPLIER |

FIG. 7

ACTIVITIES BASED DYNAMIC DATA PRIORITIZATION

The present application is a CONTINUATION of copending patent application Ser. No. 13/328,981.

TECHNICAL FIELD

The present invention relates generally to a computer implemented method for improving the access and use of available data. Particularly, the present invention relates to a computer implemented method for activities based dynamic data prioritization.

BACKGROUND

Description of the Related Art

Users participate in many activities and interactions. Users have access to data from a variety of sources. For example, a user may be a member of many social communities. The user may send to and receive from various users and communities, messages, bookmarks, blog updates, forum contributions, file sharing, posts, emails, and many other forms of data using a variety of interactions.

SUMMARY

The illustrative embodiments provide a method for activities based dynamic data prioritization. An embodiment selects a user activity corresponding to a user. The embodiment constructs a query corresponding to the user activity. The embodiment executes the query on a data source to obtain a result set of data. The embodiment constructs a prioritization rule using a feature of the query and a policy. The embodiment prioritizes data items in the result set of data according to the prioritization rule to form prioritized data. The embodiment presents the prioritized data relative to the user activity.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The user interactions through social communities and networks are increasing. Correspondingly, the volume of data available to the user is also increasing. The illustrative embodiments recognize that finding relevant information from a changing stream of such data in a timely manner is a complex and time consuming task.

In a data processing environment, a user participates in a variety of activities. The illustrative embodiments recognize that certain data available to the user may be more relevant to one user activity than another activity. The illustrative embodiments further recognize that even the data that may be relevant to an activity may no longer be as relevant once the corresponding activity is complete.

The illustrative embodiments further recognize that many activities are planned in advance or can be anticipated in advance. The data relevant to an upcoming activity can reside in any one of several data sources accessible to a user. The illustrative embodiments recognize that timely collection of data that is relevant to a present or future activity is a non-trivial task.

The illustrative embodiments further recognize that even if data is suitably selected and timely collected corresponding to an activity, the volume of selected data can still be daunting. The illustrative embodiments recognize that the selected data should be prioritized in some manner so that the most relevant data, the least relevant data, and data corresponding to other degrees of relevance to an activity is distinguished from one another relative to the activity.

Presently available methods for presenting data collect data from static sources, and organize the data in a predefined manner. For example, a presently available method for organizing email messages includes user-defined filters and sorting criteria to organize the emails. Some presently available methods include auto-organizers that utilize heuristics based guesses for groupings emails.

An example of such auto-organizers is the junk mail filters that categorize an email as junk or useful based on predefined criteria. The illustrative embodiments recognize, however, that such organizing is presently limited to predefined criteria. The illustrative embodiments further recognize that such organizing is also not responsive to planned or predicted activities. For example, the organizing does not select or prioritize the emails as they relate to certain activities, such as an upcoming meeting on the user's calendar.

Another presently used method is for organizing data in Really Simple Syndication (RSS) feeds. Such a method utilizes pre-defined categories in which to classify data of certain feeds. The illustrative embodiments recognize that such a method employs statically defined classification, which even if created to correspond to some activity at the time of creation, do not change as the activities change or new activities are planned. Furthermore, for each RSS feed that is added or deleted, the classification has to be manually reconfigured.

Another presently used method uses a combination of user-specified preferences and heuristics to guess which feeds may be of interest to the user. The illustrative embodiments recognize that such a method still uses statically defined preferences, and is non-responsive to the changes in user activities, as the activities are planned and executed.

The illustrative embodiments used to describe the invention generally address and solve the above-described problems and other problems related to dynamically managing available data. The illustrative embodiments provide a method for activity based dynamic data prioritization. Within the scope of the illustrative embodiments, a dynamic action is an action responsive to a changing circumstance. For example, a dynamic prioritization is prioritization in response to a change in user activities, such as an activity about to be executed within a threshold time, or a planned activity changes state and becomes active.

An illustrative embodiment detects changes in user activities. Some examples of user activities contemplated within the scope of the illustrative embodiments include but are not limited to: appointment changes on a calendar application, messaging activities in an instant messaging application, notifications posted or changed on a subscribed feed or bulletin board, notification received from an interactive forum in which the user participates, a message communicated via a social networking environment in which the user participates, and a status change of a watched item on an trading website.

An illustrative embodiment identifies a set of data sources and dynamically and automatically creates a set of one or more search queries for those data sources. For example, an embodiment constructs a query using keywords, tags, likes, participants, subject, object, equivalence, history, location, time, dependency, instructions, a feature, or a combination thereof, associated with the activity in question.

An illustrative embodiment dynamically creates a prioritization rule based on the one or more search queries. For example, an embodiment creates a new prioritization rule, or changes an existing prioritization rule according to the terms in the query, a target data source of the query, expected results from the query, or a combination thereof. The dynamically created prioritization rule uses one or more policy instructions in conjunction with the query features to generate a prioritized set of data.

The prioritized set of data is dynamically prioritized because the data is collected dynamically in response to a changing activity, and the prioritization rule is created dynamically in response to a changing query, which changes the order in which data appears in the prioritized data. As an example, according to an embodiment, a data record may be relevant to more than one activity, but may be prioritized differently in different prioritized sets of data output corresponding to different activities.

An illustrative embodiment further prepares, formats, or otherwise organizes the prioritized set of data, such as for presenting the prioritized set of data on a portal. As an example, a portal website may specify a structure in which an application should present data to be posted on the portal. An embodiment organizes the prioritized set of data according to such a portal specification or profile. According to an embodiment, the portal, the prioritized set of data, or a combination thereof, can be integrated into another application, such as a social networking website, browser plug-in, or client application that the user already uses.

The illustrative embodiments are described with respect to certain activities only as examples. Such descriptions are not intended to be limiting on the illustrative embodiments. For example, certain illustrative embodiments are described using a calendar entry only as an example scenario where the illustrative embodiments are applicable, without implying a limitation of the illustrative embodiments thereto. An embodiment can be used in conjunction with other user activities in a similar manner within the scope of the illustrative embodiments.

Similarly, the illustrative embodiments are described with respect to certain activity features, query features, and data source features only as examples. Such descriptions are not intended to be limiting on the illustrative embodiments. For example, an illustrative embodiment described with respect to a keyword in a query can be implemented with a time of search or target of search within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of computing resource, such as a physical or virtual data processing system or components thereof, that may be available in a given computing environment.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
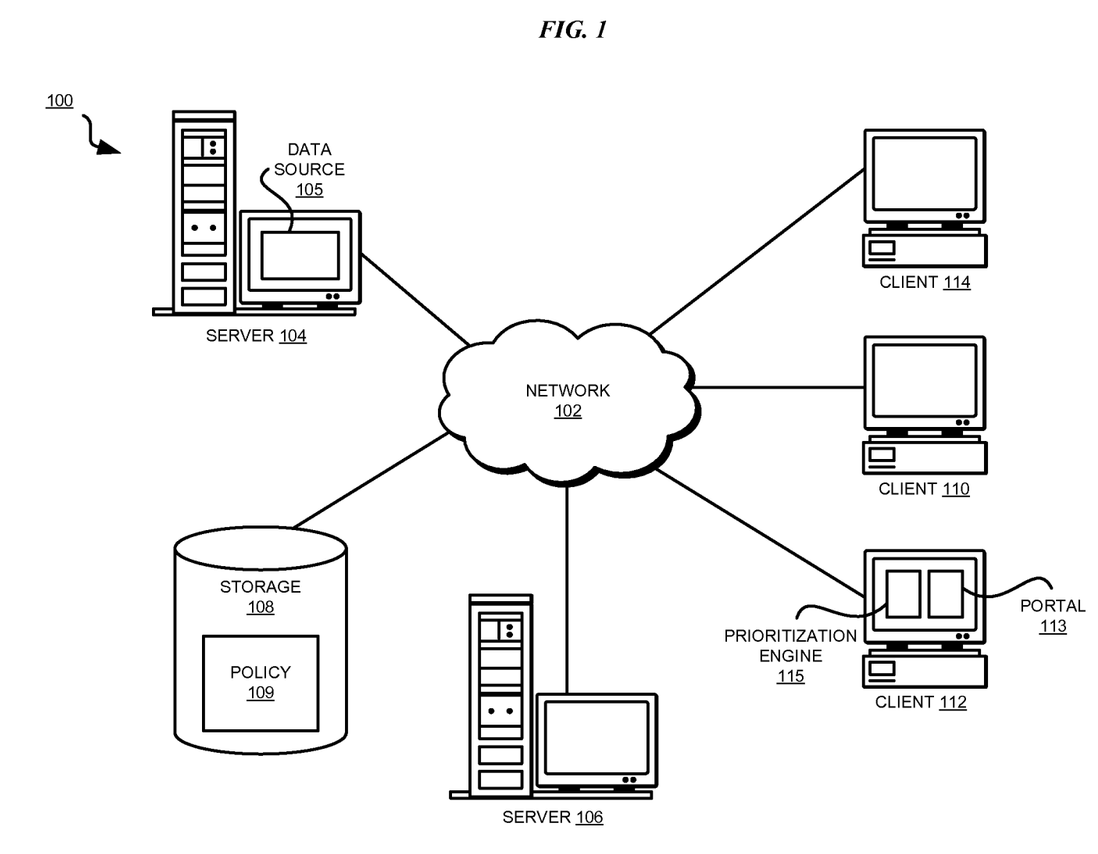
FIG. 1 depicts a pictorial representation of a network of data processing systems in which illustrative embodiments may be implemented.
Figure 2:
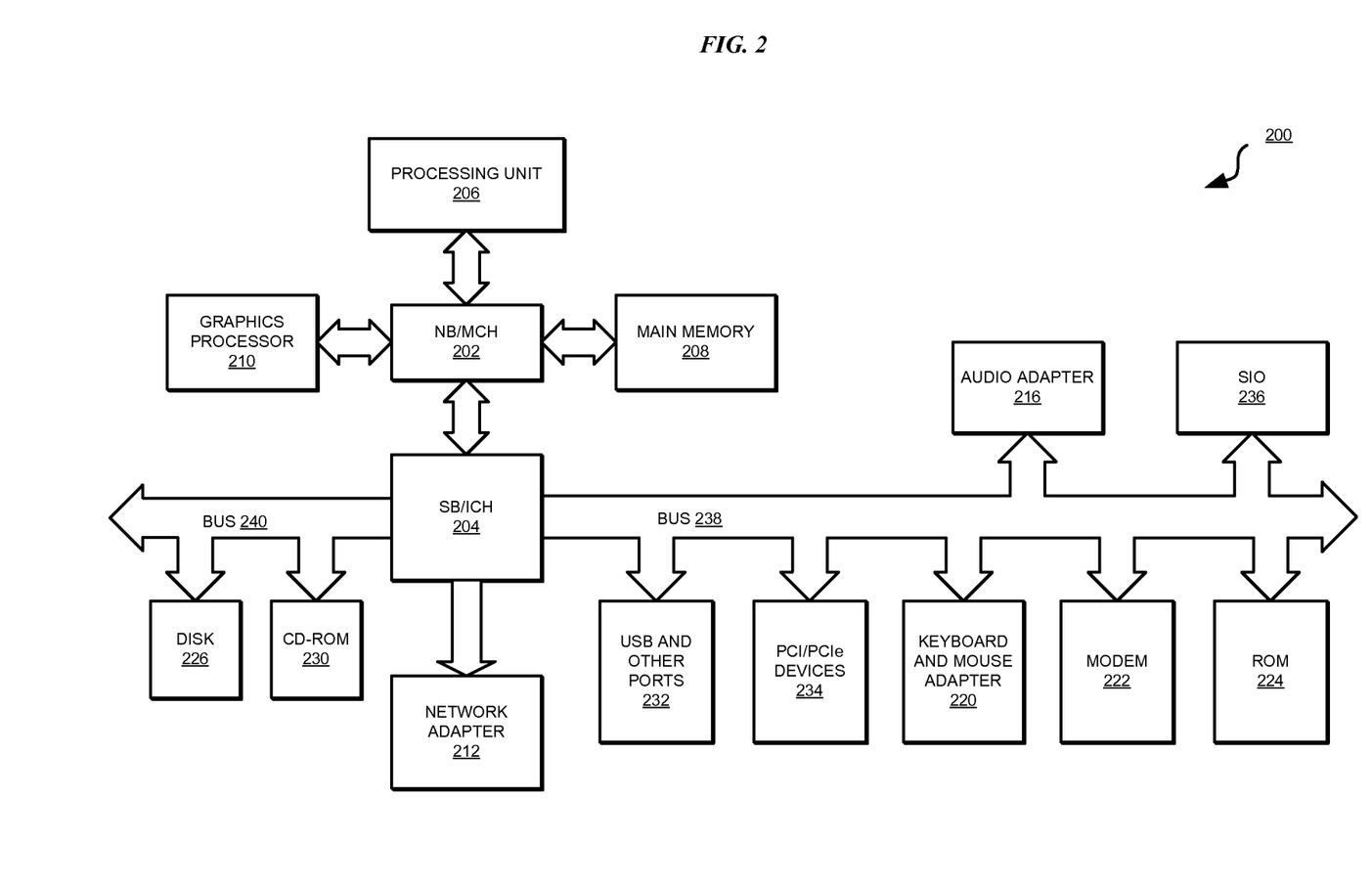
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

A data processing system, such as server 104 includes data source 105. Data source 105 may provide all or part of data according to a dynamically created query of an embodiment. Client 112 may include portal 113. Portal 113 may be any suitable application or component for presenting data, using which an embodiment can present a prioritized set of data. Prioritization engine 115 prioritizes search result data according to one or more dynamically created rules according to an embodiment. Policy 109 in storage 108 may be used for dynamically creating one or more prioritization rule according to an embodiment. An existing application may be modified to implement an embodiment of the invention described herein. Alternatively, an application implementing an embodiment may operate in conjunction with another application in a data processing environment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA or Smartphone.

Figure 3:
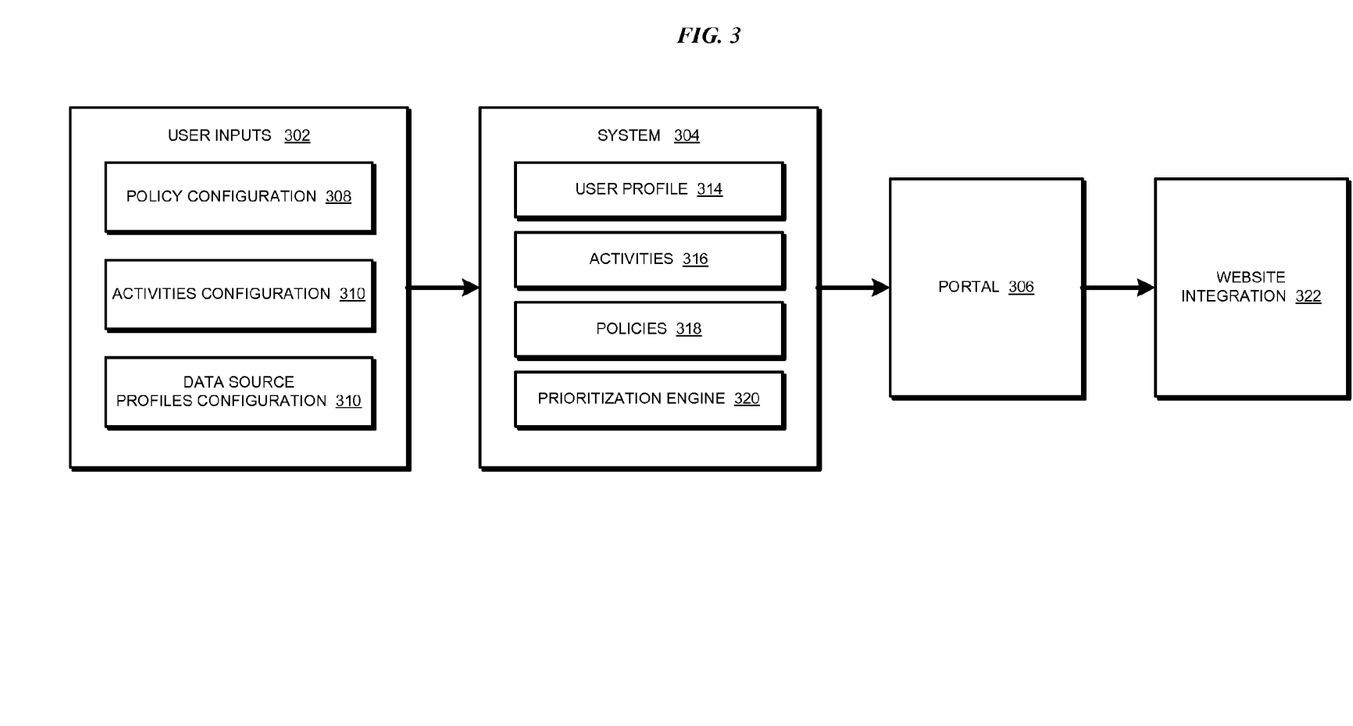
FIG. 3 depicts an example configuration for activity based dynamic data prioritization in accordance with an illustrative embodiment.

With reference to FIG. 3, this figure depicts an example configuration for activity based dynamic data prioritization in accordance with an illustrative embodiment. User inputs 302 may be received using any application, such as but not limited to portal 113 in FIG. 1. In one embodiment, a configuration application (not shown) collects user inputs 302. System 304 comprises one or more applications, one or more data repositories or connections there to, or a combination thereof. Portal 306 is analogous to portal 113 in FIG. 1.

User inputs 302 includes policy configuration component 308. Component 308 enables creating or editing a policy that is usable for dynamically building a prioritization rule according to an embodiment.

Activities configuration component 310 enables a user to create, delete, modify, plan, or program a user activity. In one embedment, component 310 also detects user activities in other applications, such as via integration or messaging with those applications. For example, component 310 may synchronize with, or receive a notification from, a calendar application when a user creates a meeting appointment in the calendar application.

As another example, a social networking website may notify component 310 via a subscription to a user's profile, such as by "following" the user's profile on the social networking website, or adding the user as a "friend" on the social networking website. As an example, component 310 may detect that the user has received a message to which the user is likely to respond. Furthermore, component 310 may determine that the user typically responds to messages on the social network within a predetermined time period, such as by maintaining and comparing a response time history. Accordingly, component 310 may determine that a response activity is likely to occur at the end of the predetermined time period.

Data source profiles configuration component 312 allows a user to configure identification information, subscription information, license information, certificates, access privileges, and other such information usable for communicating with one or more data sources. Using such information, an embodiment can communicate with one or more data sources, query them, and prioritize the resulting data, dynamically in response to user activities.

System 304 includes user profile 314. User profile 314 allows an embodiment to identify a user whose activities 316 are to be used for searching and prioritizing data. Policies 318 may be associated with one or more users, and are usable for creating a prioritization rule according to an embodiment. As an example, some policies in policies 318 may be created for a group of users, whereas other policies in policies 318 may be user-specific. Furthermore, certain policies 318 may be editable, and others may not. For example, a policy in policies 318 may pertain to prioritizing emergency notifications above all other data. Such a policy may not be changed by a user.

Figure 4:
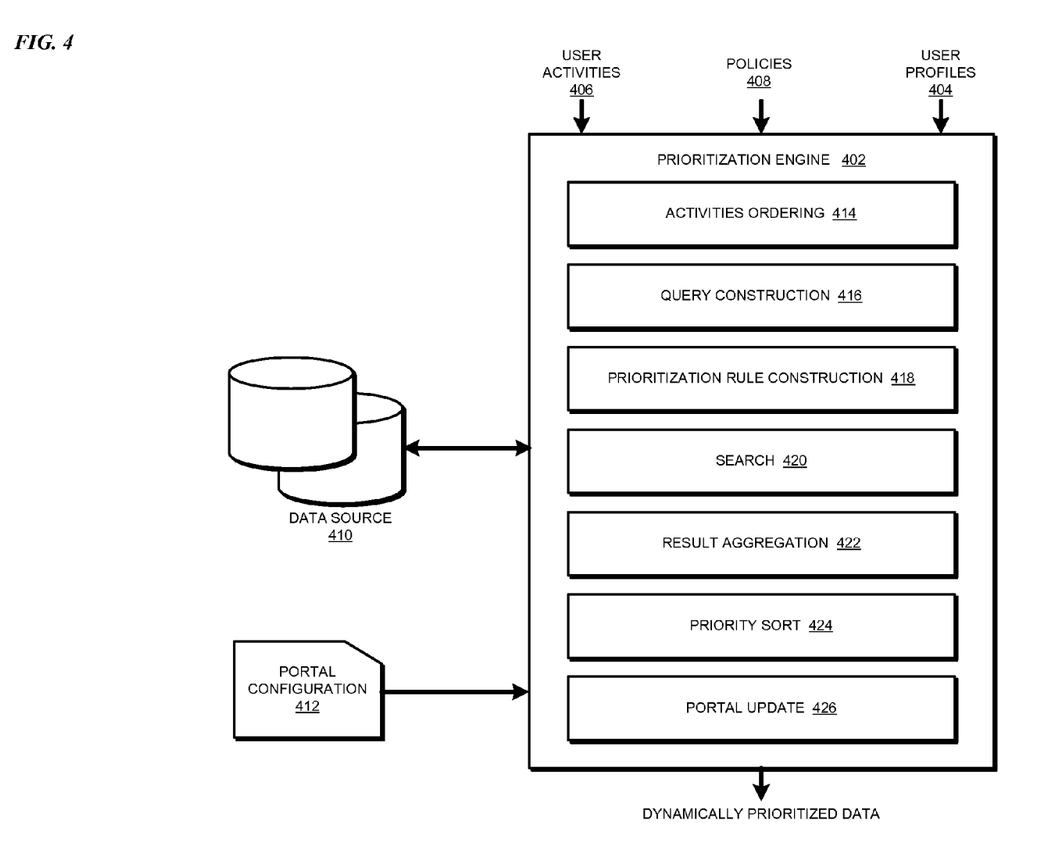
FIG. 4 depicts a block diagram of an example configuration of a prioritization engine in accordance with an illustrative embodiment.

Prioritization engine 320 is analogous to prioritization engine 115 in FIG. 1. Prioritization engine 320 is an application or a component thereof, configured to prioritize search results in response to the activity in question. FIG. 4 depicts an example configuration of prioritization engine 320.

Prioritization engine 320 produces a prioritized set of data that can be presented to the user via portal 306. Portal 306 may optionally be integrated into other websites or portals using website integration 322.

With reference to FIG. 4, this figure depicts a block diagram of an example configuration of a prioritization engine in accordance with an illustrative embodiment. Prioritization engine 402 can be used as prioritization engine 320 in FIG. 3.

Prioritization engine 402 receives as inputs user profile 404, analogous to user profile 314 in FIG. 3. Prioritization engine 402 receives a set of one or more user activities 406, analogous to activities 318 in FIG. 3, and corresponding to user profile 404. Prioritization engine 402 receives a set of one or more policies 408, analogous to policies 318 in FIG. 3, and corresponding to user profile 404.

Data source 410 is a set of one or more data sources. Portal profile 412 is a specification for providing data for presentation via a portal, such as portal 306 in FIG. 3.

Prioritization engine 402 includes activities ordering component 414, which orders user activities 406. In one embodiment, component 414 orders user activities 406 in a chronological order of the time at which an activity in user activities 406 is to begin. In another embodiment, component 414 orders user activities 406 in an order of importance, such as by ordering an activity that is mandatory before an activity that is optional. Generally, an embodiment may order user activities 406 in any suitable manner within the scope of the illustrative embodiments.

Query construction component 416 dynamically constructs a query for searching all or some of data source 410, for data corresponding to an activity in the ordered list of user activities 406. For example, suppose the activity occupying the first position in the ordered list of user activities 406 is a meeting on the user's calendar. Further suppose that the meeting is with a department head (head) named John Doe (Doe), about product XYZ (XYZ) release date (release), including programmer Jane Smith (programmer) and the user (user ID JackJones). Query construction component 416 may indentify "head" (a role), "Doe" (a last name), "XYZ" (a product), "release" (a date), "programmer" (a position), and "Jack Jones" (a user ID) as being relevant to the activity. Component 416 dynamically constructs a query that searches one or more data source 410 for data relevant to the activity (meeting) for pertaining to a combination of the role, the last name, the product, the date, the position, the user ID at or about the time of the activity.

Prioritization rule construction component 418 dynamically constructs a rule for prioritizing the data that results from the query constructed by query construction component 416. Component 418 uses a policy in performing this function.

Search component 420 selects one or more data sources 410 as the target for a query created by component 416. If component 416 creates more than one query, such as for targeting different data sources 410, search component 420 searches appropriate data source 410 using an appropriate query.

Results aggregation component 422 aggregates the search results from more than one data source 410. Priority sort component 424 performs the sorting, or prioritization, of the aggregated results from component 422 using the prioritization rule constructed by component 420. Portal update component 426 formats or configures the prioritized data from component 424 for presentation to the user, for example, via a portal.

The operation of prioritization engine 402 is described using the above example meeting. Continuing with the above example, a policy in policies 408 may be a weighting policy for data. For example, using a weighting scale of 1-10, the policy may provide that data about the release date is to be weighted 8; data about the product XYZ is to be weighted 8; data about the department head is to be weighted 4; data about the person with last name "Doe" is to be weighted 2; data about programmers is to be weighted 2; and data about the user is to be weighted 2. A result set of the query may return a comment by a programmer about the product on a corporate intranet; a publication announcing a release date of the product; the department head's memo to the programmer team about a release date push back for the product; and the user's update to the user's profile to indicate employment with the company.

A prioritization rule according to an embodiment uses information from the activity, information from the query, and the policy to assign weights to the data in the result set. Accordingly, the prioritization rule weights the data as follows—the comment by the programmer (weight 2) about the product (weight 8) on the corporate intranet (total weight of the comment 2+8=10); the publication announcing the release date (weight 8) of the product (weight 8) (total weight of the publication 8+8=16); the department head's (weight 4) memo to the programmer team (weight 2) about the release date (weight 8) push back for the product (weight 8) (total weight of the memo 4+2+8+8=22); and the user's update (weight 2) to the user's profile to indicate employment with the company (total weight of the update 2).

In the above example, the result set includes data having weights 10, 16, 22, and 2. Component 418 assigns the weights to the data in the result set, and prioritizes the result set according to the weight of the data, thereby prioritizing the data as follows—memo, publication, comment, and update. As is evident from this example, an embodiment can advantageously organize activity related data by dynamically searching, timely collecting, and dynamically prioritizing according to the planned or anticipated activity.

Figure 5:
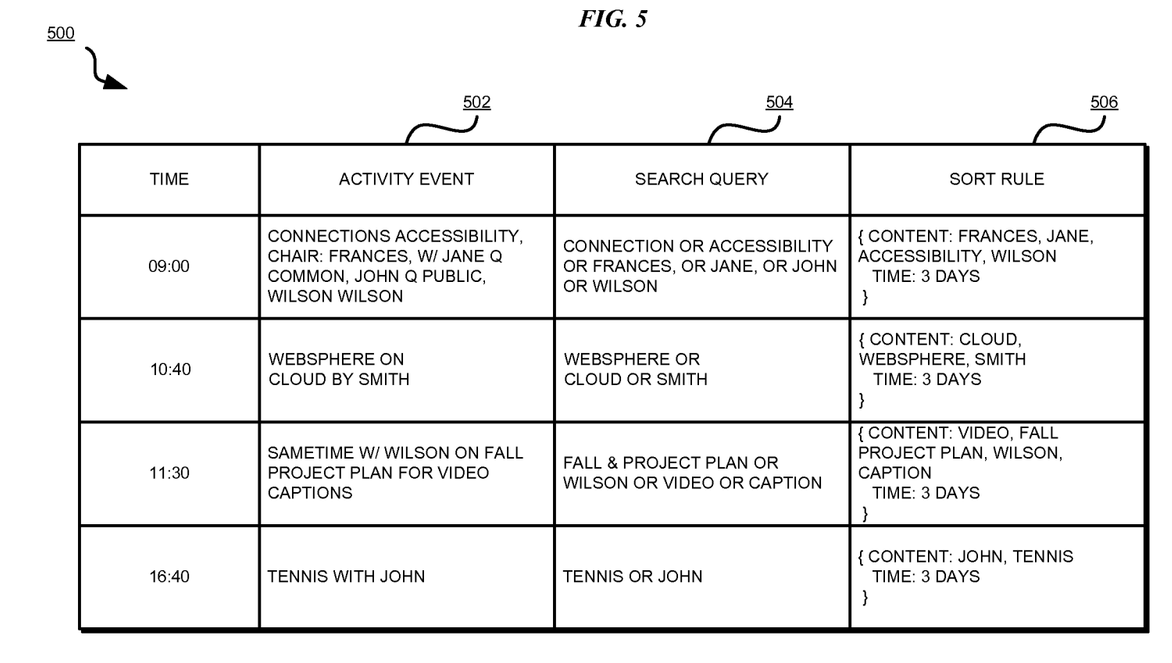
FIG. 5 depicts a table of ordered activities, corresponding dynamically constructed query, and corresponding dynamically constructed prioritization rule in accordance with an illustrative embodiment.

With reference to FIG. 5, this figure depicts a table of ordered activities, corresponding dynamically constructed query, and corresponding dynamically constructed prioritization rule in accordance with an illustrative embodiment. Table 500 includes column 502 of activities that can be used as activities 406 in FIG. 4. Table 500 includes column 504 of queries that can be dynamically constructed for corresponding activities in column 502 by query construction component 416 in FIG. 4. Table 500 includes column 506 of prioritization rules that can be dynamically constructed for corresponding queries in column 504 by prioritization rule construction component 418 in FIG. 4.

The activities, the queries, and the prioritization rules are depicted with pseudo code. Using the disclosure, one of ordinary skill in the art will be able to organize other activities in a similar manner, and construct corresponding queries and rules according to any applicable syntax.

Figure 6:
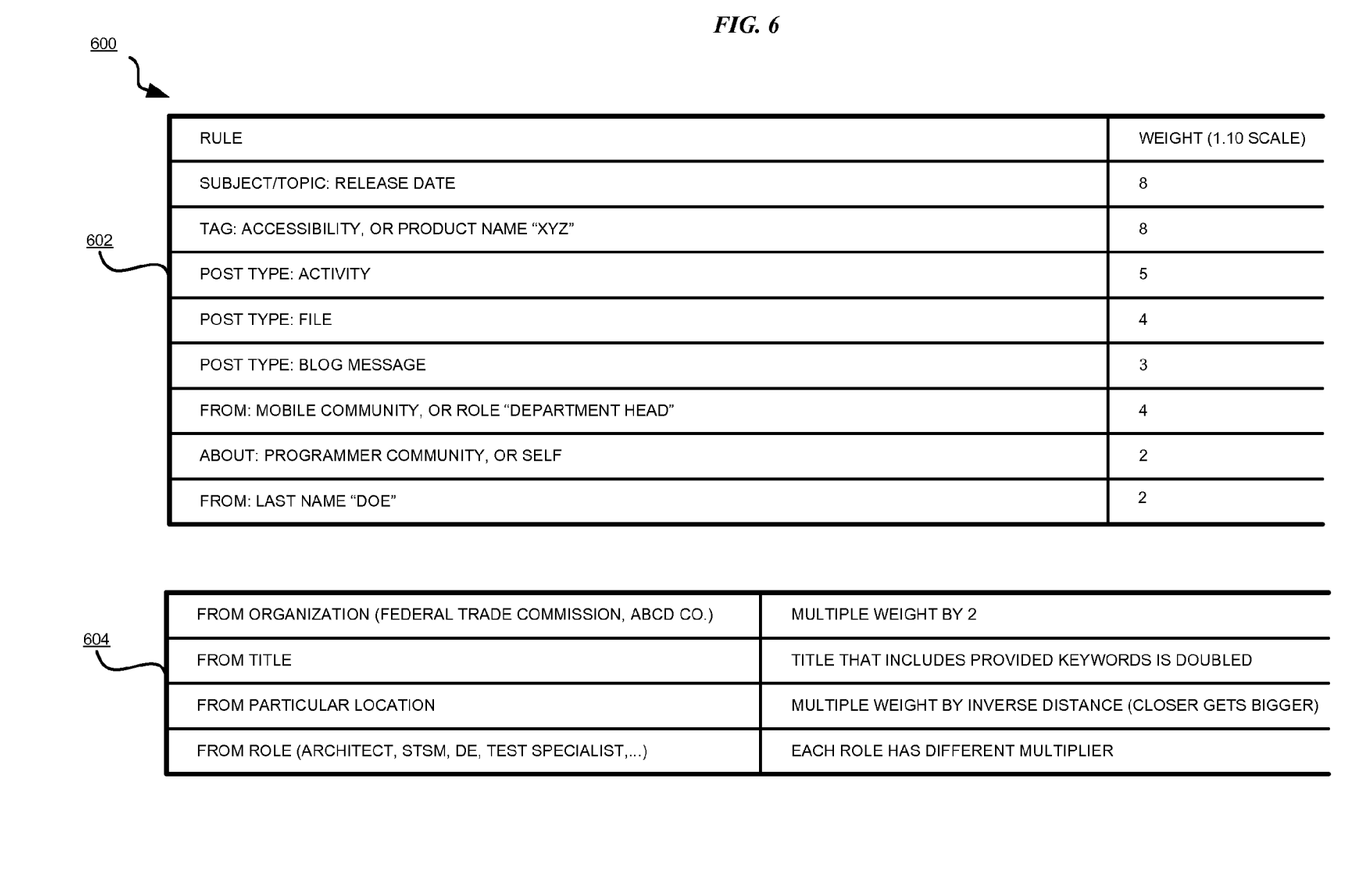
FIG. 6 depicts a block diagram of an example policy file in accordance with an illustrative embodiment.

With reference to FIG. 6, this figure depicts a block diagram of an example policy file in accordance with an illustrative embodiment. Policy 600 can be used as one of policies 408 in FIG. 4. Table 602 depicts, only as an example and not as a limitation, a weighting rule that assigns certain weights to certain data or data components. For example, a message from a blog is weighted 3, and a page tagged with "accessibility" keyword is weighted 8. Thus, if data is from a blog and includes a link to a page that is tagged with the "accessibility" keyword, the total weight of that data will be 3+8=11.

Furthermore, as an example, policy 600 includes table 604, which provides further weighting adjustments according to an embodiment. For example, the weight of data from a particular organization, e.g., the "Federal Trade Commission," is multiplied by 2. If in the above example, the data from the blog having the link to the page with tag "accessibility" is from the Federal trade Commission's blog, the weight of that data will be 9*2=18.

Figure 7:
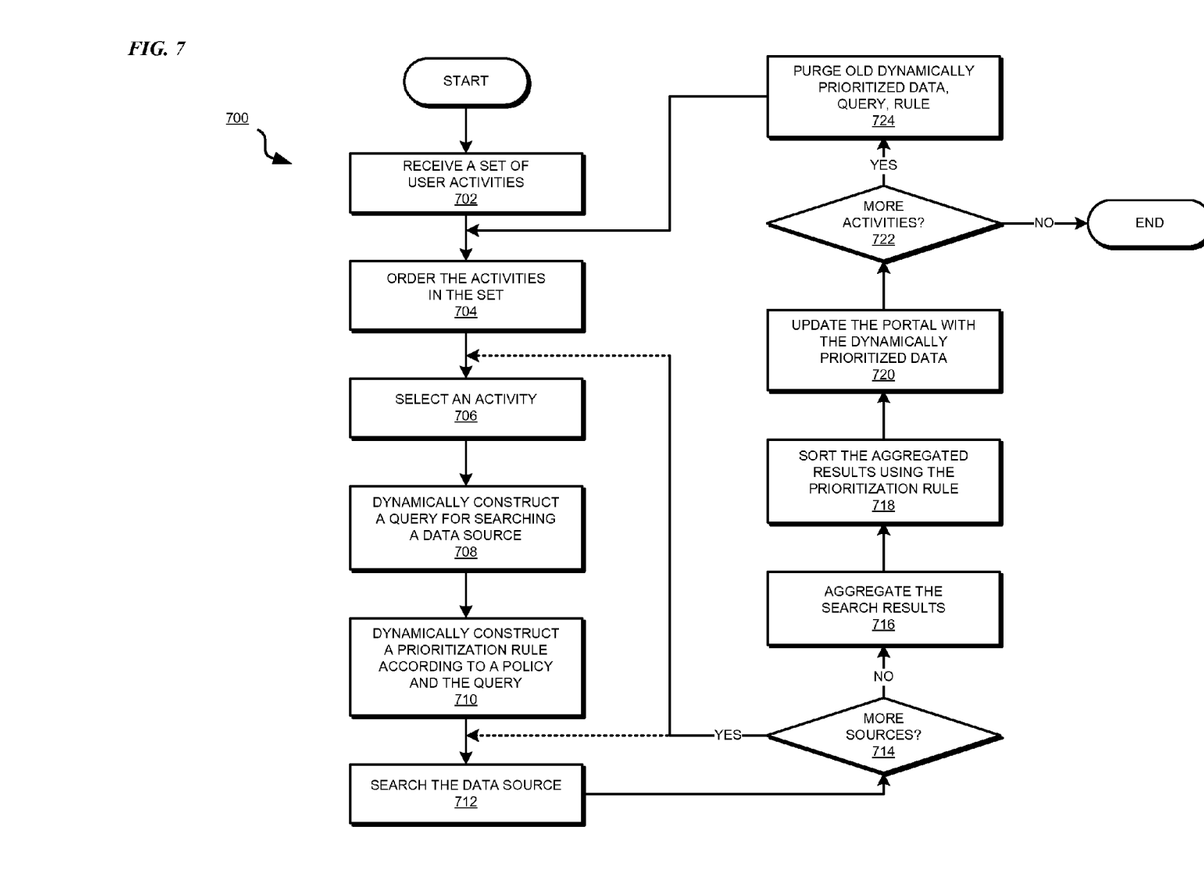
FIG. 7 depicts a flowchart of a process of activity based dynamic data prioritization in accordance with an illustrative embodiment.

With reference to FIG. 7, this figure depicts a flowchart of a process of activity based dynamic data prioritization in accordance with an illustrative embodiment. Process 700 can be implemented in a prioritization engine, such as prioritization engine 402 in FIG. 4.

Process 700 begins by receiving a set of user activities (step 702). Process 700 orders the activities in the set according to a suitable order, not limited to chronological ordering (step 704). Process 700 selects an activity from the ordered list, in order (step 706). Process 700 dynamically constructs a query for searching one or more data sources for data relevant to the selected activity (step 708). Process 700 may construct more than one query in step 708.

Process 700 dynamically constructs a prioritization rule according to one or more policies and the query or queries of step 708 (step 710). Process 700 searches one or more data sources using the query or queries of step 708 (step 712).

Process 700 determines whether more data sources remain to be searched (step 714). In one embodiment, a suitable scope of a query can be determined and the same query can be submitted to multiple data sources. In such a case, process 700 returns to step 712 ("Yes" path of step 714), and searches another data source with the same query. In another embodiment, a new query may be needed to search another data source. In such a case the "Yes" path of step 714 returns to step 708. The prioritization rule of step 710 may be adjusted if new queries are created for the same activity.

If no more data sources have to be searched ("No" path of step 714), process 700 aggregates the search results from the searched data sources (step 716). Process 700 sorts the aggregated results using the prioritization rule (step 718). Process 700 may update a portal or another suitable location for presenting the prioritized data (step 720).

When process 700 is executed in a loop for several activities, process 700 determines whether more activities are present in the set of step 702 (step 722). If more activities are present ("Yes" path of step 722), process 700 may purge old dynamically prioritized data, query, prioritization rule, or a combination thereof, or move them to a repository (step 724). Process 700 then returns to step 704. If no more activities are present in the set ("No" path of step 722), process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for activity based dynamic data prioritization. Using an embodiment, a user can be presented with data from a variety of constantly changing streams of data and data sources. An embodiment selects a set of planned or expected user activities and orders them. Based on the order of the activities, an embodiment selects relevant data from a set of data sources by dynamically constructing a search query according to the activity. The embodiment prioritizes the result set according to the activity, the query, and a policy. The prioritized data is presented to the user in a suitable manner.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable medium that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for activity based dynamic data prioritization, the method comprising:
   selecting a user activity corresponding to a user;
   constructing a query corresponding to the user activity, wherein the query comprises a set of terms, wherein a term in the query is derived from a term appearing in the activity;
   executing the query on a data source to obtain a result set of data;
   constructing a prioritization rule using a feature of the query and a policy, wherein the constructing comprises identifying a correspondence between a term in the query and a term in the policy wherein the policy assigns a weight to the term in the policy, and assigning in the prioritization rule the weight to the term in the query;
   prioritizing data items in the result set of data according to the prioritization rule to form prioritized data, wherein each data item in the result set has a corresponding computed weight, wherein a data item in the result set corresponds to a subset of terms in the query, wherein the subset of terms have associated therewith a corresponding subset of weights according to the prioritization rule, wherein a computed weight of the data item is computed using the subset of weights assigned to the subset of terms in the query, and wherein the prioritizing prioritizes the data items according to their corresponding computed weights; and
   presenting the prioritized data relative to the user activity.

2. The method of claim 1, further comprising:
   receiving a set of user activities; and
   ordering, using a processor and a memory, the set of user activities to form an ordered set of user activities, wherein selecting the user activity is selecting the user activity from the ordered set of user activities.

3. The method of claim 2, wherein the set of user activities includes a planned activity and an expected activity.

4. The method of claim 2, wherein an activity in the set of user activities is a planned meeting on a calendar application.

5. The method of claim 2, wherein the ordering orders the set of user activities according to a chronological order.

6. The method of claim 1, wherein the query uses a feature of the user activity to find data relevant to the feature.

7. The method of claim 1, further comprising:
   constructing a second query using a second feature of the user activity, wherein the prioritization rule further uses a second feature from the second query.

8. The method of claim 1, wherein the policy comprises a weighting rule for a plurality of features of the user activity.

9. The method of claim 1, wherein the policy is not configurable by the user.

10. The method of claim 1, further comprising:
    executing the query on a second data source to obtain a second result set of data; and
    aggregating the result set of data and the second result set of data.

11. The method of claim 1, wherein the presenting uses a portal.

12. The method of claim 1, further comprising:
    receiving profile information to connect to the data source.

* * * * *